United States Patent [19]
Soshi et al.

[11] Patent Number: 5,548,361
[45] Date of Patent: Aug. 20, 1996

[54] CAMERA WITH DATA DISPLAY FUNCTION

[75] Inventors: Isao Soshi, Shibuya-ku; Hidenori Miyamoto, Urayasu; Toshiyuki Nakamura, Shinagawa-ku, all of Japan

[73] Assignee: Nikon Corporation, Tokyo, Japan

[21] Appl. No.: 187,313

[22] Filed: Jan. 27, 1994

[30] Foreign Application Priority Data

Jan. 28, 1993 [JP] Japan ................... 5-012896

[51] Int. Cl.⁶ ........................... G03B 17/24
[52] U.S. Cl. ............................ 354/106
[58] Field of Search ............... 354/105, 106, 354/109

[56] References Cited

U.S. PATENT DOCUMENTS

| | | | |
|---|---|---|---|
| 3,827,070 | 7/1974 | Hoerenz et al. | 354/105 |
| 4,198,146 | 4/1980 | Taguchi et al. | 354/106 |
| 4,508,438 | 4/1985 | Kahaoka et al. | 354/105 |
| 5,155,513 | 10/1992 | Matsumura | 354/106 |
| 5,182,590 | 1/1993 | Kaihara et al. | 354/106 |
| 5,194,892 | 3/1993 | Robison | 354/106 |
| 5,276,472 | 1/1994 | Bell et al. | 354/76 |
| 5,311,240 | 5/1994 | Wheeler | 354/402 |
| 5,325,138 | 6/1994 | Haoata | 354/106 |

FOREIGN PATENT DOCUMENTS

| | | |
|---|---|---|
| 3278041 | 12/1991 | Japan . |
| 4136830 | 5/1992 | Japan . |
| 4139433 | 5/1992 | Japan . |
| 4298729 | 10/1992 | Japan . |
| 4350832 | 12/1992 | Japan . |

*Primary Examiner*—Michael L. Gellner
*Assistant Examiner*—Nicholas J. Tuccillo
*Attorney, Agent, or Firm*—Oliff & Berridge

[57] ABSTRACT

A camera having a data display function maintains a uniform shape of the characters even when several characters are displayed. Even when the resulting characters include gaps, the gaps are uniformly positioned in all of the characters that are displayed. The timing of the start of the data display of each character is linked to one of the front or the back edge of the pulse signal. That is, every character is started at the front edge of the pulse signal, or every character is started at the back edge thereof.

25 Claims, 8 Drawing Sheets

CAMERA WITH DATA DISPLAY FUNCTION

BACKGROUND OF THE INVENTION

1. Field of the Invention

This invention is concerned with a camera equipped with a data display function in which the data display function is designed so that several light emitting elements are driven concurrently with the scrolling of the film through the camera, enabling the display of data characters on the film.

2. Description of Related Art

Heretofore, cameras equipped with a data display function, in which several light emitting elements (such as LEDs) are driven concurrently with the scrolling of the film in order to display data characters on the film in dot matrix form, use an encoder to produce a signal concurrent with the scrolling of the film through the camera in order to provide timing for the data display.

The encoder includes opaque parts and transparent parts provided alternately in a radial direction at specified angular intervals on the encoder, which is rotatable. A photo-interrupter, through which the encoder rotates, detects these transparent and opaque parts, thereby causing the generation of pulses.

In order to make the camera smaller, it is necessary to make this encoder smaller. However, due to the limited sensitivity of the photo-interrupter, it is necessary to form the opaque parts and the transparent parts with a certain minimum width. Accordingly, in making the encoder smaller, it has been impossible to increase the number of opaque and transparent parts above a certain level. Additionally, the minimum tolerable width of opaque parts is different from the minimum tolerable width of the transparent parts. Accordingly, when the maximum number of opaque and transparent parts are provided on an encoder (by using the different minimum widths for the opaque and transparent parts), the pulses produced from the opaque parts have a different pulse width than the pulses produced from the transparent parts. This results in a non-uniform pulse signal being output by the photo-interrupter. The disadvantages of such a signal are detailed as follows.

In order to achieve proper timing for the display of characters in dot matrix form during the scrolling of the film, it is necessary to have a large number of pulses (such as, for example, 360 pulses) for each frame of the film. Generally, this is due to the size of the view screen and the characters being displayed. As a result, proper timing for the data display has been achieved by using signals (i.e., pulses) produced from both the opaque parts and the transparent parts of the encoder. In other words, both the front and the back edges, which result from the transition between transparent/opaque parts and opaque/transparent parts, of the pulse signal are used. Alternatively, depending on the size of the view screen, the duration (a) of a pulse is measured, and the interval a/2 is used for time control.

However, due to the dispersed arrangement of the photo-interrupter, the linkage of it to the encoder and various tolerance errors in the installation of the various parts, it is difficult to ensure that the detection time of the opaque parts and of the transparent parts will be consistent on the encoder. This makes it impossible to obtain a set time interval for all of the pulse time intervals (b) produced from the opaque parts and the pulse time intervals (a) produced from the transparent parts.

Accordingly, for the pulse time being measured, when the pulse time interval (a) of pulses produced from the transparent parts is measured, and when it differs from the pulse time interval (b) of pulses produced from the opaque parts, the data characters are not positioned in the middle of the time interval (b) pulses when using the time a/2 for time control, so that either the front or back dots of a character are shifted. As a result, the shape of each character differs when several characters are displayed, making it difficult to read the display. This has been especially true when the same character was repeatedly displayed.

FIG. 7 illustrates this problem, which is associated with conventional display procedures. The pulse signal 81 is produced by the photo-interrupter as the encoder rotates through it. The pulses having time duration (a) are produced when the transparent parts of the encoder pass through the photo-interrupter. The pulses having the time duration (b) are produced when the opaque parts of the encoder pass through the photo-interrupter. As can be seen from FIG. 7, the pulses produced from the opaque parts have a longer duration than the pulses produced from the transparent parts. Accordingly, when the boundaries or edges between pulses are used to trigger or otherwise control dot formation and when a second dot is formed at a time period a/2 after formation of the dot produced from the pulse edge, gaps are formed in the resulting characters because b≠a. Moreover, in conventional cameras, this gap can be located at different portions of different characters. For example, referring to FIG. 7, the gap is located between the second and third columns of dots in the first, fifth and sixth characters; between the third and fourth columns of dots in the second character; and between the fourth and fifth columns of dots in the third and fourth characters. This non-uniformity in the shapes of the characters makes them difficult to read.

SUMMARY OF THE INVENTION

An object of this invention is to provide a camera with a data display function that can maintain the uniform shape of the characters even when several characters are displayed. Even if the resulting characters include gaps, the gaps are uniformly positioned in all of the characters that are displayed.

In order to solve the above and other problems, the present invention links the timing of the start of the data display of each character in the display drive control means to one of the front or the back edge of the pulse signal. That is, every character is started at the front edge of the pulse signal, or every character is started at the back edge thereof. The camera is equipped with a data display function that contains a signal output means that produces a pulse signal concurrently with the scrolling of the film; a data display means that displays several characters on the film in dot matrix form; and a display drive control means that counts both the front and back edges of the pulse signals and drives the data display means each time the edges are counted.

In accordance with the present invention, the start of the display of each character in dot matrix form occurs with the same timing. For example, the first column of dots for each character to be displayed always is linked to the start (front edge) of the pulse that is produced from the transparent parts of the encoder. Alternatively, the first column of dots for each character to be displayed could always be linked to the end (back edge) of the pulse that is produced from the transparent parts of the encoder (this also could be referred to as the start (front edge) of the pulse that is produced from the opaque parts of the encoder). In either case, any gap that may be formed in the characters is located in the same position of every character. Accordingly, the shape of each character always is uniform, even if the period of the pulse wave of the signal produced concurrently with the scrolling of the film is irregular.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

Figure 1:
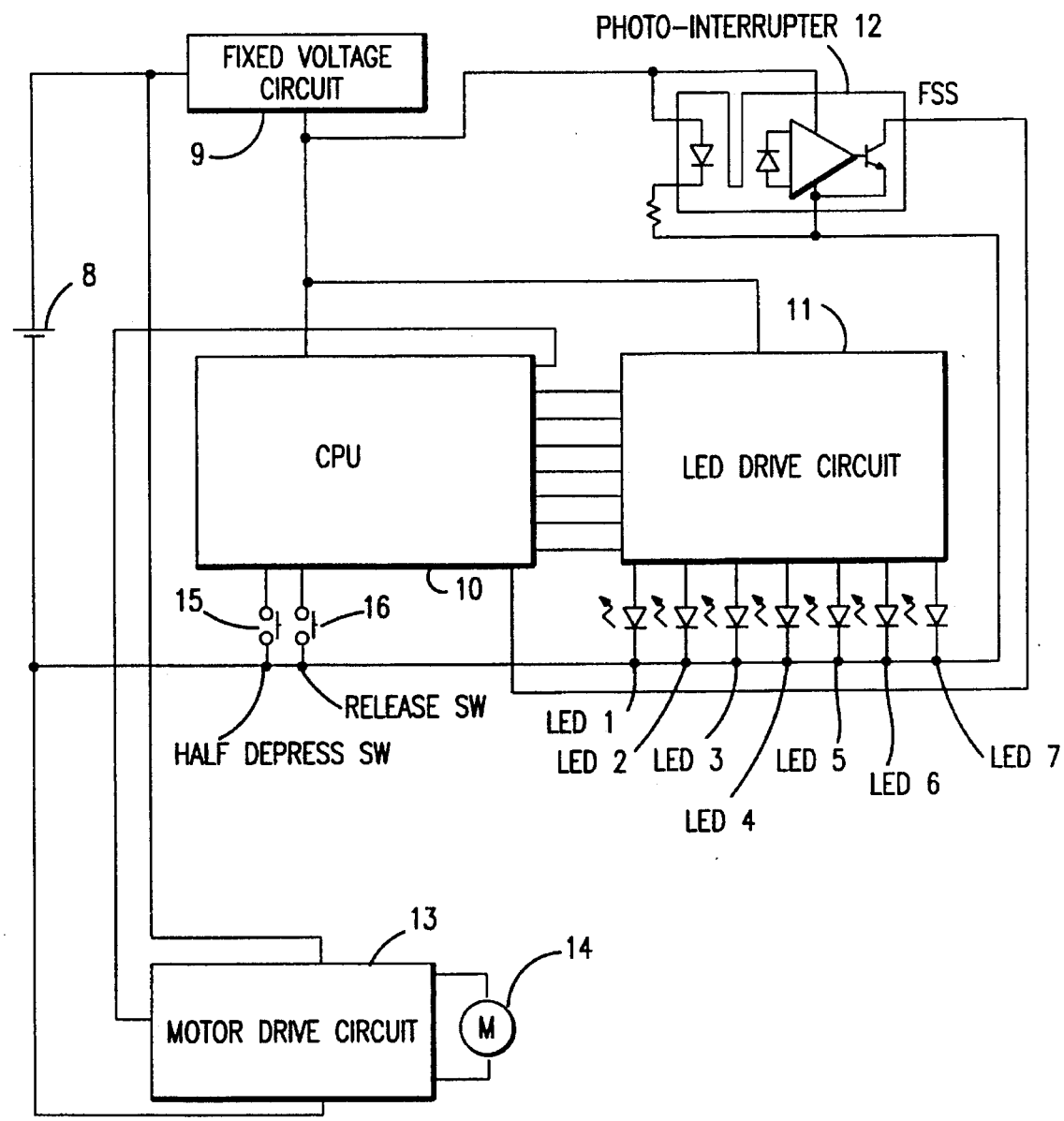
FIG. 1 is a circuit diagram of an embodiment of the invention.

FIG. 1 is a circuit diagram of an embodiment of the invention. A battery 8 is connected to a motor drive circuit 13 and to a constant voltage circuit 9. The constant voltage circuit 9 is a stabilizing power source circuit designed to keep the voltage steady even when the voltage of the battery fluctuates. In this example, circuit 9 produces 5 volts, which is supplied to a CPU 10, an LED drive circuit 11 and a photo-interrupter 12.

Connected to the CPU 10 are a half-depress switch 15 that turns on when the release button of the camera is depressed halfway, and a release switch 16 that turns on when the release button is depressed all the way. Furthermore, the photo-interrupter 12, the LED drive circuit 11 and the motor drive circuit 13 also are connected to the CPU 10. The seven light-emitting elements LED1–LED7 (hereafter referred to as "LEDs") are connected to and driven by the LED drive circuit 11.

The signal line that conveys the output signal (hereafter referred to as the "FSS") of the photo-interrupter 12 is connected to the CPU 10. Furthermore, the film-scrolling motor 14 is connected to the motor drive circuit 13.

Figure 3:
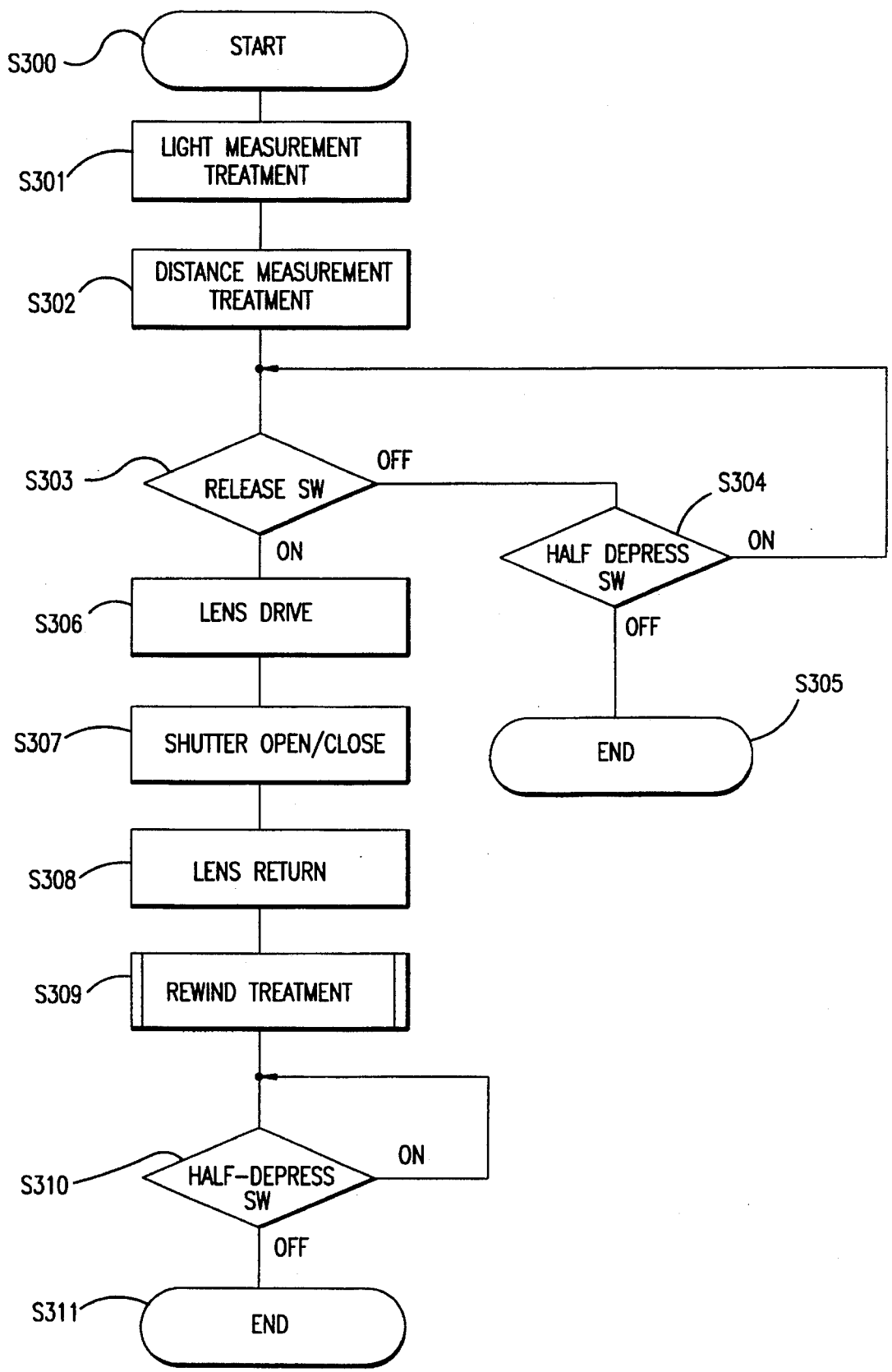
FIG. 3 is a flowchart showing the operation of a photographic process of the invention.
Figure 4:
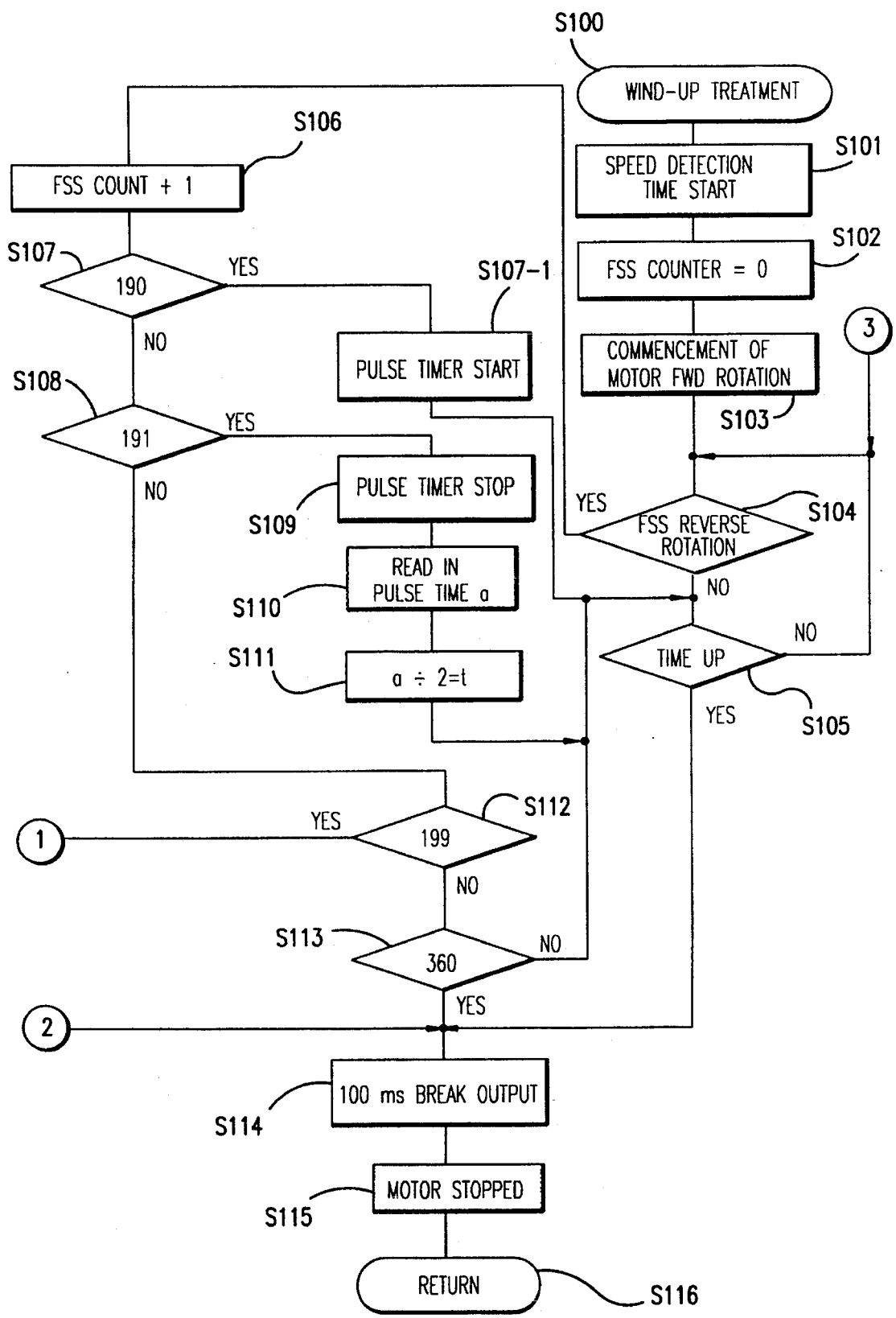
FIG. 4 is a flowchart showing the operation of a first part of a winding and display process of the invention.
Figure 5:
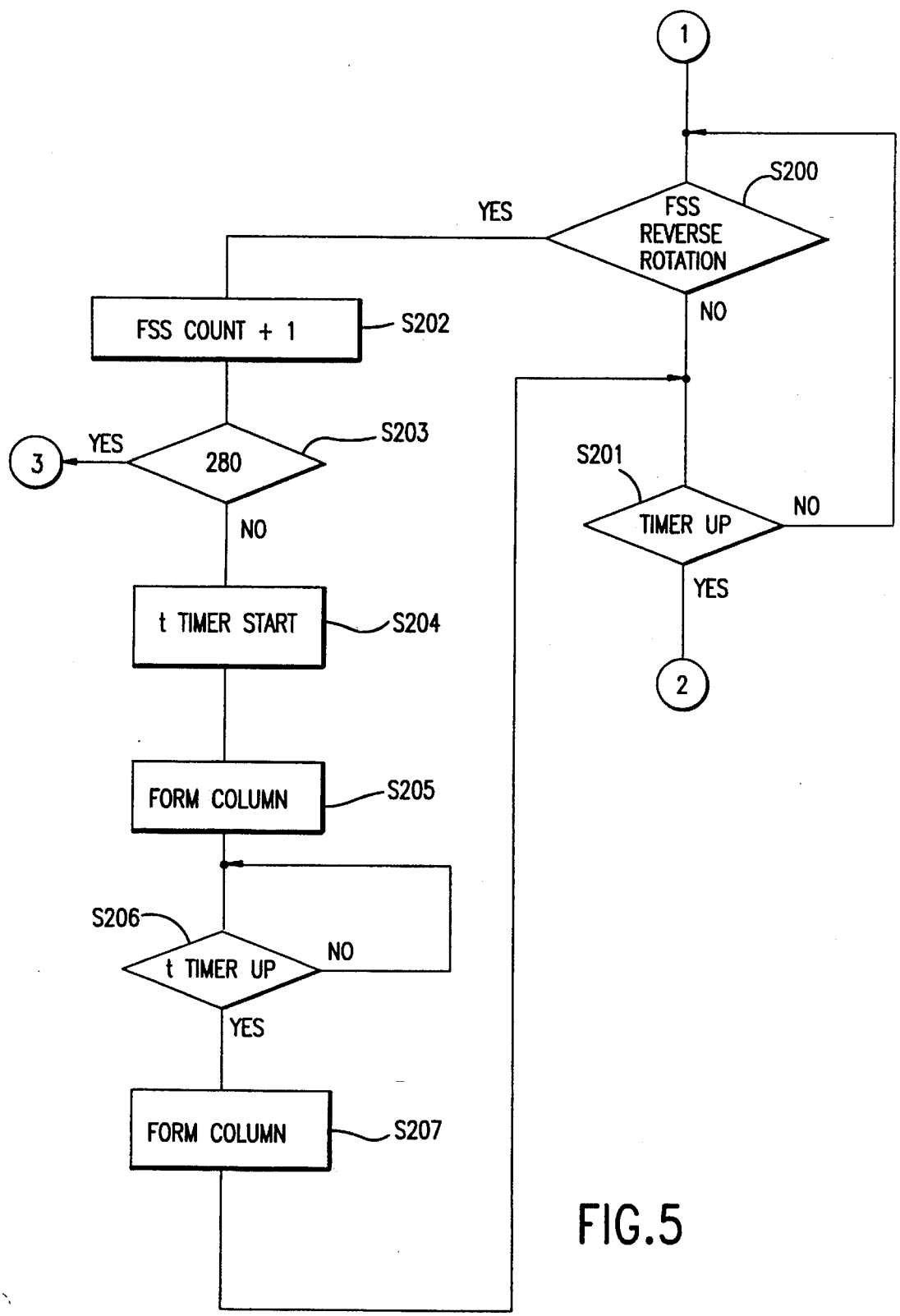
FIG. 5 is a flowchart showing the operation of a second part of a winding and display process of the invention.

The CPU 10 is, for example, a single chip microcomputer that controls all sequences of the camera. The processes shown on the flowcharts in FIGS. 3 through 5 represent portions of programs performed by the CPU 10 that relate to the embodiment of the present invention. Furthermore, the FSS counter, the speed detection timer, etc. shown in the flowcharts are provided in the CPU 10.

The LED drive circuit 11 illuminates LED1–LED7 based on control signals supplied from the CPU 10, and controls each of these LEDs independently depending on the characters to be formed. The motor drive circuit 13 controls the film-scrolling motor 14 based on control signals supplied from the CPU 10.

Figure 2:
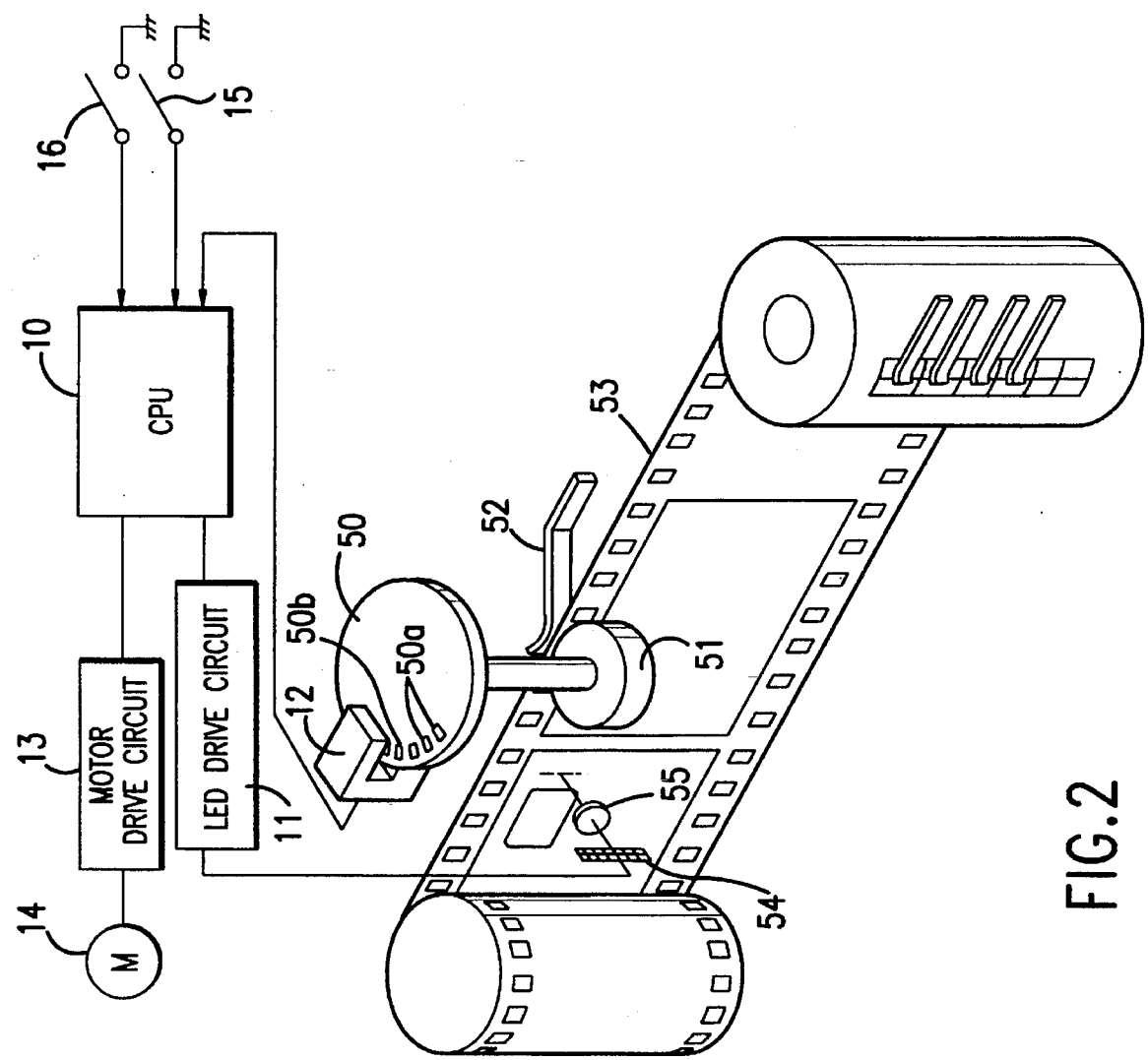
FIG. 2 shows the film scrolling system in the FIG. 1 embodiment of the invention.

FIG. 2 illustrates the film scrolling system of the embodiment of the invention. In this figure, the film 53 is kept in contact with a scroll detection roller 51 by pressure from spring 52. The roller 51 rotates as the film 53 moves when driven by the film-scrolling motor 14. Because the roller 51 and the encoder 50 are an integral unit, the encoder 50 rotates with the roller 51. On the encoder 50, opaque parts 50b and transparent parts 50a are provided alternately in a radial direction at regular intervals. The transparent and opaque parts of the encoder 50 alternately pass between the light transmitter and the light receiver of the photo-interrupter 12 as the encoder 50 rotates. As this action is detected by the photo-interrupter 12, a film scroll signal (FSS) is produced. As detailed above, LED array 54 (corresponding to LED1–LED7 in FIG. 1) is used in the data display process, and is mounted on the side facing the film.

In FIG. 2, LED1 is mounted at the top and LED7 is mounted at the bottom. Because the characters to be displayed on the film are displayed in an inverted manner, LED7 corresponds to the top of the characters, while LED1 corresponds to the bottom of the characters. A condensing collection lens 55 condenses the light emitted from the LED array 54 onto the surface of the film 53. Through this structure, the data is displayed on the surface of the film. In this embodiment, the seven LEDs LED1–LED7 form one column of a character, and one character is formed by five columns.

FIG. 3 is a flowchart showing the photographic process of a camera embodying the present invention. An explanation of the flow of operations in the photographic process of a camera embodying the present invention is provided hereafter, with reference to FIG. 3. It is presumed that a battery has already been installed. The process commences with step S300 when the half-depress switch 15 is turned on. Initially, in step S301, the CPU 10 sends a signal to a photometer circuit (not shown), and the photometry process is performed. Details of the well known photometry process are omitted here, but it results in the brightness of the object being calculated from the amount of light received by the photometer circuit's photoreceptor, as a result of which the shutter stop time is determined. Next, in step S302, a signal is sent to the distance finder circuit (not shown), which then begins the process of measuring the distance to the object being photographed. Details of the well known distance finding process are omitted here. When the distance finder circuit has finished measuring the distance, the results are sent to the CPU 10. After that, the CPU proceeds to the loop containing steps S303 and S304. When it is confirmed in step S304 that the half-depressed switch 15 is off, the process is terminated in step S305, in which case, a photograph is not taken.

On the other hand, if it is confirmed in step S303 that the release switch 16 is on, the CPU proceeds to step S306. In step S306, the lens is moved to a certain position based on the distance value found in step S302. Then, in step S307, the shutter is opened and closed based on the shutter stop time found in step S301. Next, in step S308, the lens is returned to its initial position. Furthermore, in step S309, the film is wound, and at the same time the data is displayed on the surface of the film. The winding process will be explained in detail hereafter. Next, the CPU proceeds to step S310 and waits for the half-depress switch 15 to turn off. When it is confirmed in step S310 that the half-depressed switch 15 is off, the process is terminated in step S311.

FIGS. 4 and 5 are flowcharts showing the winding process and the display process. The processes referred to in step S309 of FIG. 3 correspond to the winding and display processes shown in FIGS. 4 and 5.

Hereafter, it is assumed that during the winding process in this embodiment, one frame of the film 53 corresponds to 360 edges (that is, boundaries between opaque and transparent parts of the encoder) of the pulse signal FSS. In addition, the standard winding time will be taken to be 720 ms per frame on average. Furthermore, in one embodiment, it also is assumed that the data display begins at the 200th edge during the winding of one frame and that the display is executed over the interval from edge 200 to edge 280. The data to be recorded on the film by the LED array 54 is pre-processed so that it can be recorded over the span of 80 pulses. In this example, the process waits until the 200th pulse to display the data so that the film reaches a substantially constant speed. That is, when film-scrolling motor 14 begins to scroll the film, the film speed is non-uniform. Once the film has scrolled by a certain distance, however, such as the distance required to output about 200 pulses, the film speed is uniform and, therefore, the film speed can be accurately measured and data recording on the film can be performed at this time.

In FIG. 4, the speed detection timer is started in step S101. The speed detection timer detects the speed of the film movement based on the time intervals between the edges of the FSS, so that the film is scrolled at a constant speed. Furthermore, it also has the function of detecting when the film reaches its terminal end. The speed detection timer measures the time interval between edges of the FSS, and its time expires when the FSS is not produced continuously at a constant rate (for example, when the end of the film is reached).

Next, in step S102, the FSS counter is set to 0. The FSS counter is a counter designed to count the number of FSS pulses that are produced during the scrolling of one frame of the film. Then, in step S103, forward rotation of the motor 14 commences. When the motor 14 rotates forward, the film 53 is scrolled in the direction of winding. After the motor 14 has begun its forward rotation, the CPU 10 proceeds to the loop including steps S104 and S105. In step S104, a determination is made as to whether the FSS has reversed, and in step S105, a determination is made as to whether the time on the speed detection timer has expired. If the time on the speed detection timer expires in step S105, the CPU determines that the film has reached its terminal end, so a brake is applied to the motor 14 at 100 ms intervals in step S114, and the motor 14 is stopped in step S115. From this point, the CPU proceeds from step S116 to step S310 of FIG. 3.

On the other hand, if reversal of the FSS is detected in step S104, the FSS counter is increased by an increment of one in step S106. Thus, step S104 detects edges in the FSS. Reversal of the FSS occurs when the FSS changes from high to low or from low to high, indicating passage of a boundary between adjacent opaque and transparent parts of the encoder through the photo-interrupter 12.

In step S107, the CPU determines whether the FSS counter is at 190. As a result of that determination, if the FSS counter is at 190, the pulse timer is started in step S107-1 in order to measure the interval between pulses (edges), and the CPU then proceeds to the loop containing steps S104 and S105. When another reversal of the FSS is detected in step S104, flow proceeds through steps S106 and S107 to step S108. In step S108, the CPU determines whether the FSS counter is at 191. As a result of that decision, the CPU proceeds to step S109 if the FSS counter is at 191, and then the pulse timer is stopped, and the pulse time (a) is read in step S110.

Next, the value (t), or a/2, is determined in step S111. The CPU then proceeds to the loop containing steps S104 and S105 as detailed above. If the FSS counter is not at 191 in step S108, in step S112 the CPU determines whether the FSS counter is at 199. As a result of that decision, if the FSS counter is at 199 the CPU proceeds to step S200 in FIG. 5 and initiates the data display process from the timing of the input of the next edge. If the FSS counter is not at 199 in step S112, the CPU proceeds to step S113 and determines whether the FSS counter is at 360. As a result of that decision, if the FSS counter is at 360, the scrolling of one frame has been completed so a brake is applied for 100 ms in step S114, the motor is stopped in step S115 and the CPU returns to FIG. 3 from step S116. If the FSS counter is not at 360 in step S113, the CPU proceeds to step S105, executes the loop containing steps S104 and S105, and again waits for either time to expire or for an FSS reversal.

Next, FIG. 5 will be used to explain the process that is executed after the CPU proceeds to step S200 if the FSS counter is at 199 in step S112. First, the loop containing steps S200 and S201 is executed and the CPU waits for the next FSS reversal. When the FSS reverses in step S200, the FSS counter is at the 200th edge so the display process is initiated.

The display process is as follows. First, in step S202, the FSS counter is increased by an increment of one. Subsequently, in step S203, the CPU determines whether the FSS counter is at 280. As a result of that decision, if the FSS counter is at 280, the display process is terminated and the CPU proceeds to step S104 in FIG. 4 and executes the loop containing steps S104 and S105.

If the FSS counter is not at 280 in step S203, the display process of step S204 is executed. This display process consists of first starting the timer to begin measuring the interval t=a/2 in step S204, executing the display (that is, forming a column) concurrent with the pulse of the FSS in step S205, and executing the display (forming the next column) between FSS signals in step S207 when it is decided in step S206 that the interval t=a/2 has elapsed. Next, the CPU proceeds to the loop containing steps S200 and S201 and again waits for an FSS reversal.

Figure 4A:
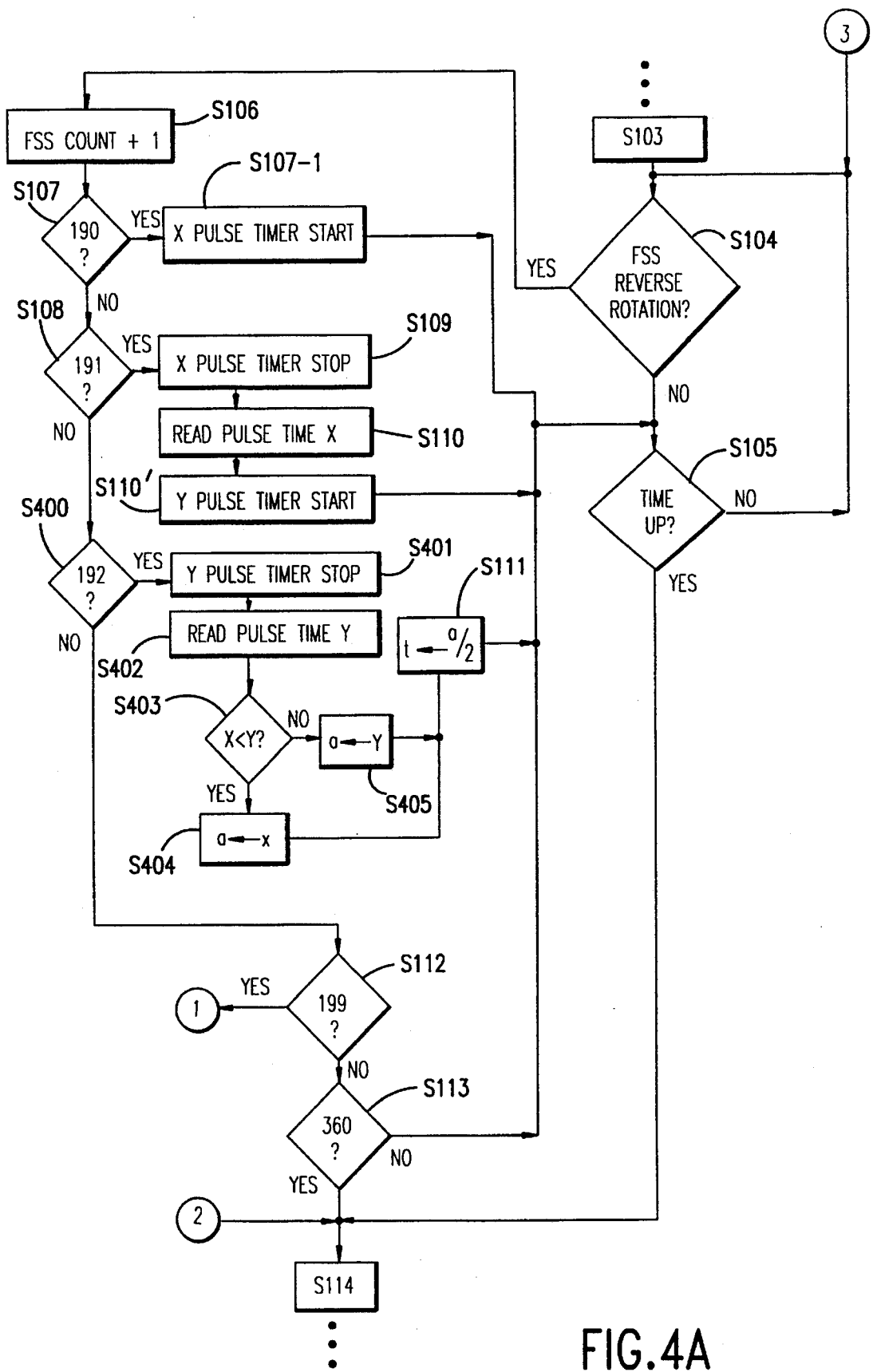
FIG. 4A is a flowchart showing the operation of a variation of the FIG. 4 process.

In the example described above, the process of FIG. 4 assumes that the boundary corresponding to the front edge of a transparent portion 50a of the encoder 50 causes the 190th pulse, and, therefore, the time between the 190th and 191st pulses corresponds to the duration of the transparent portion 50a. Similarly, because every other pulse is caused by the passage of the front edge of the transparent portion 50a through the photo-interrupter 12, the 200th pulse also corresponds to the front edge of the transparent portion 50a. If it cannot be assumed that the 190th pulse results from the front edge of the transparent portion 50a, the process of FIG. 4 can be modified. As shown in FIG. 4A, the process determines whether the pulse between the 190th and 191st edges results from passage of the transparent portion 50a through photo-interrupter 12 or whether the pulse between the 191st and 192nd edges results from passage of the transparent portion 50a through photo-interrupter 12.

The process of FIG. 4A measures the pulse duration between edges 190 and 191, assigning its value to the variable X. The FIG. 4A process also measures the duration of the pulse between edges 191 and 192, assigning its value to the variable Y. The variables X and Y are compared, and the smaller of the two values X and Y is assigned to the variable (a) because it corresponds to the pulse formed by passage of the transparent portion 50a through photo-interrupter 12. Thus, the process of FIG. 4A is similar to the process of FIG. 4 except that it performs the additional steps detailed above. When the count value equals 190, in step S107, the X pulse timer is started in step S107-1. Then, when the value of the count is 191 in step S108, flow proceeds to step S109 where the X pulse timer is stopped. In step S110, the value of the X pulse timer is assigned to the variable x. In step S110', the Y pulse timer is started. Flow then proceeds to the loop containing steps S104 and S105. When the value of the counter is 192 in step S400, flow proceeds to step S401, where the Y pulse timer is stopped. In step S402, the value of the Y pulse timer is assigned to the variable Y. In step S403 the variables X and Y are compared. If X is less than Y, flow proceeds to step S404 where the value of X is assigned to the variable a. If X is not less than Y, flow proceeds to step S405 where the value of variable Y is assigned to a. Then, flow proceeds to step S111 where t is assigned a/2. The remainder of the process shown in FIG. 4A is similar to the process of FIG. 4.

Figure 6:
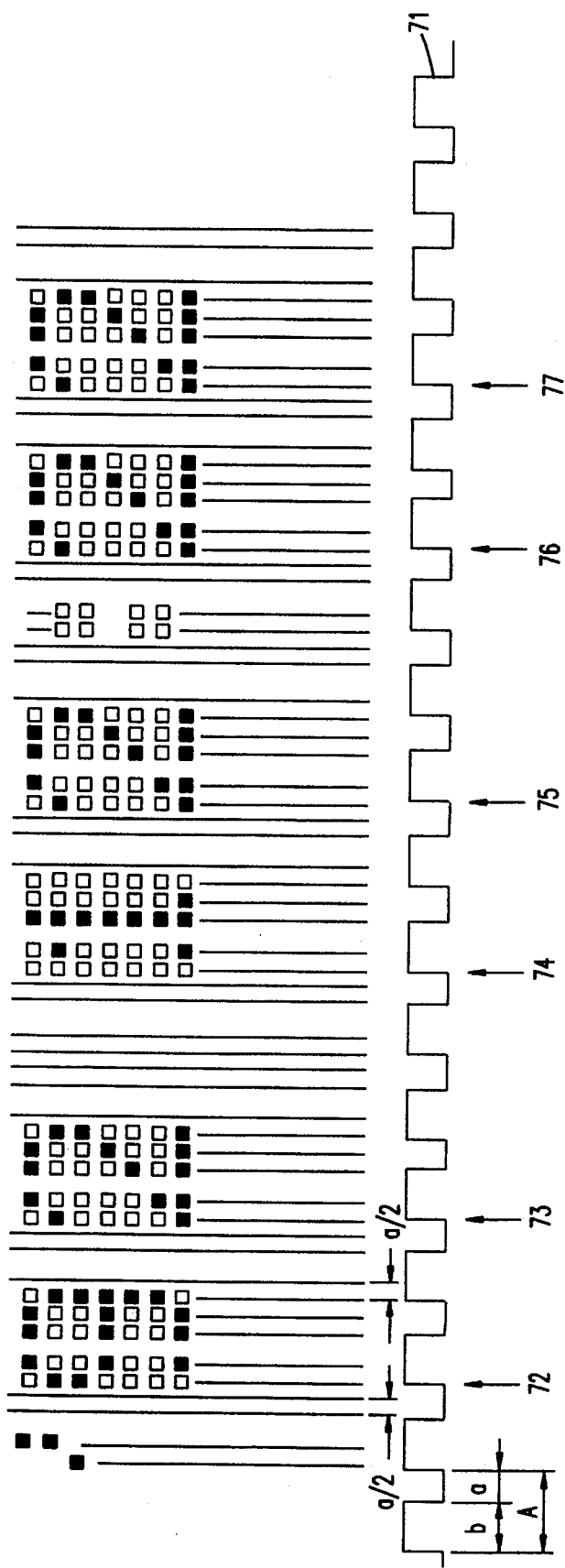
FIG. 6 shows the shape of characters displayed using the invention.

FIG. 6 shows an example of the characters displayed using an embodiment of the invention. In the illustrative embodiment of the invention, each character has a 5×7 dot structure. There are 7 LEDs, with LED7 corresponding to the top-most part of the character and LED1 corresponding to the bottom-most part of the character. In addition, a single character is formed by displaying 5 rows in the direction of the character arrangement. The illustrating embodiment of this invention shows where the LEDs are lighted based on the pulse signal, but naturally the LEDs that are not lighted depends on the character being displayed.

Item 71 illustrates the pulse signal FSS waveform produced by the photo-interrupter. The time at which the display of each character is started in FIG. 6 always corresponds to the starting edge of the transparent part 50a on the encoder, as illustrated by items 72 through 77. This is achieved by starting every character on an even-numbered edge when edge 190 (and therefore edge 200) corresponds to the front edge of the transparent portion 50a (a condition that was assumed in the FIG. 4 embodiment). However, this condition can be confirmed using the process of FIG. 4A. For example, in the process of FIG. 4A, when X<Y, it is known that the pulse between edges 190 and 191 is caused by the transparent portion 50a and that, therefore, the even-numbered edges correspond to the front edge of the transparent portions 50a. If X≮Y, the pulse between edges 190 and 191 corresponds to the opaque portion 50b of encoder 50. Therefore, the even-numbered edges correspond to the front edge of the opaque portions (the rear edge of the transparent portions), and the odd-numbered edges correspond the rear edge of the opaque portions (the front edge of the transparent portions). If it is desired to start each character at the front edge of the transparent portion 50a in this second situation (X≮Y), then each character is started on an odd-numbered edge (e.g., 201, 211, etc.). However, uniform characters also will result if every character is started on the rear edge of each transparent portion, i.e., on even-numbered edges when X≮Y. The important detail is that all characters be started on even numbered edges or that all characters be started on odd numbered edges to ensure uniform characters.

Furthermore, the time interval (a) of the transparent parts 50a is used as the time interval t=a/2. Because the time interval b of the opaque parts 50b is longer than the time interval a in this example, the distance between dots is not necessarily uniform, but each character can be displayed with a uniform shape by synchronizing the start of the display of each character.

It is also possible to produce uniform shaped characters when the value b (i.e., the duration of the opaque portions 50b) is used to determine the value of t (i.e., t=b/2). This produces uniform characters as long as every character is started on the same edge of the pulse signal (i.e., always at the front edge of the transparent portion 50a or always at the rear edge of the transparent portion 50a).

Figure 7:
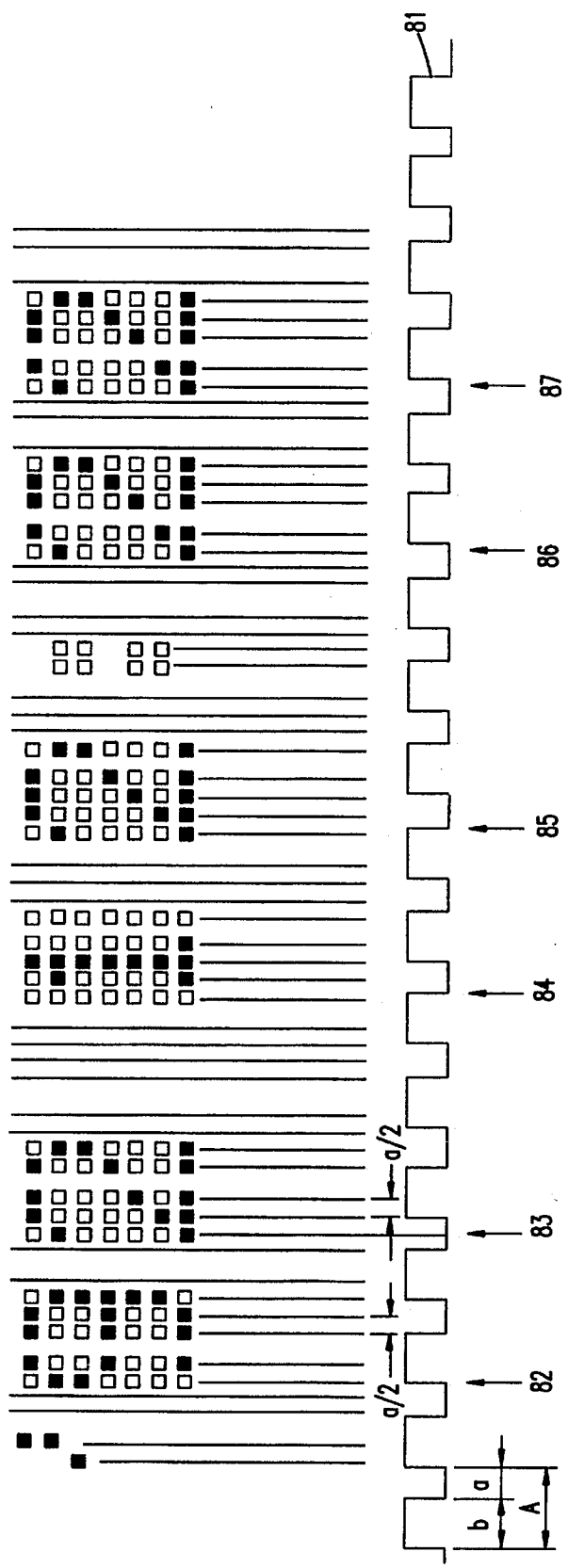
FIG. 7 shows the shape of characters displayed with conventional cameras.

FIG. 7 shows the shape of characters displayed in a conventional device. Because the start of the display of each character is not synchronized as shown in items 82 through 87, the shape of each character differs and the balance to the eye is not good.

With this invention, because the start of the display of the dot matrix characters always occurs with the same timing (that is, always at one of the beginning or the end of the short pulse), the shape of each character is uniform. This is true even when the period of the pulse output waveform of the signal that is concurrent with scrolling of the film is non-constant in a camera having a data display function that displays dot matrix data characters on the surface of the film by controlling the operation of several light emitting elements based on a pulse signal produced concurrently with the scrolling of the film. Accordingly, each character is well balanced and visually appealing.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A camera comprising:

signal output means for producing a pulse signal from scrolling of film through the camera, said pulse signal being comprised of a continuous series of pulses, each pulse having a front edge and a rear edge, a first time period extending between a front edge and a subsequent rear edge, and a second time period extending between a rear edge and a subsequent front edge, said second time period being different from said first time period such that said continuous series of pulses is a continuous series of alternating long pulses and short pulses;

data display means for displaying a series of characters in a dot matrix form on the film as the film is scrolled through the camera; and display drive control means for driving said data display means to form the series of characters on the film by forming dots linked to a series of consecutive front and rear edges of said pulse signal in accordance with character data, said display drive control means controlling a timing of a start of the display of every character formed on the film by said data display means so that every character in said series of characters is always started at the front edge of said pulse signal or every character in said series of characters is always started at the rear edge of said pulse signal.

2. The camera of claim 1, wherein said display drive control means links the timing of the start of the display of every character formed on the film by said data display means to the front edge of the pulse signal for all characters so that every character in said series of characters is started at the front edge of said pulse signal.

3. The camera of claim 1, wherein said display drive control means includes:

means for counting a time interval, a, between adjacent front and rear edges of said pulse signal; and means for determining a dot formation time interval, t, according to the formula t=a/n, wherein n is a positive number greater than 1; and wherein said display drive control means also drives said data display means to form dots on the film at said time interval t between said front and rear edges of the pulse signal.

4. The camera of claim 3, wherein n=2.

5. The camera of claim 3, wherein said means for counting includes:

means for determining a duration of one of said first and second time intervals that is a duration of said short pulses, and for assigning the duration of said one time interval to a.

6. The camera of claim 5, wherein n=2.

7. A camera comprising:

an encoder system that produces a pulse signal from scrolling of film through the camera, said pulse signal being comprised of a continuous series of pulses, each pulse having a front edge and a rear edge, a first time period extending between a front edge and a subsequent rear edge, and a second time period extending between a rear edge and a subsequent front edge, said second time period being different from said first time period such that said continuous series of pulses is a continuous series of alternating long pulses and short pulses;

a data display device that displays a series of characters in a dot matrix form on the film as the film is scrolled through the camera; and a display drive controller that drives said data display device to form the series of characters on the film by forming dots linked to a series of consecutive front and rear edges of said pulse signal in accordance with character data, said display drive controller controlling a timing of a start of the display of every character formed on the film by said data display device so that every character in said series of characters is always started at the front edge of said pulse signal or every character in said series of characters is always started at the rear edge of said pulse signal.

8. The camera of claim 7, wherein said display drive controller links the timing of the start of the display of every character formed on the film by said data display device to the front edge of the pulse signal for all characters so that every character in said series of characters is started at the front edge of said pulse signal.

9. The camera of claim 7, wherein said display drive controller includes:

a pulse time interval counter that counts a time interval, a, between adjacent front and rear edges of said pulse signal; and wherein said display drive controller also drives said data display device to form dots on the film at a time interval, t, between said front and rear edges of the pulse signal, said display drive controller determining said dot formation time interval, t, according to the formula t=a/n, wherein n is a positive number greater than 1.

10. The camera of claim 9, wherein n=2.

11. The camera of claim 9, wherein said pulse time interval counter determines a duration of one of said first and second time intervals that is a duration of said short pulses as said time interval, a.

12. The camera of claim 11, wherein n=2.

13. The camera of claim 7, further comprising:

a film scrolling mechanism that scrolls the film through a film path from a supply spool to a take-up spool and past said data display device, said encoder system located adjacent to said film path to detect the scrolling of the film and to produce said pulse signal.

14. The camera of claim 13, wherein said encoder system includes:

a roller, located in the film path, said roller contacting the film in the film path so as to rotate when the film is scrolled by the film scrolling mechanism;

an encoder linked to said roller so as to rotate with said roller, said encoder including a plurality of members; and a pulse generator located adjacent to said encoder, said pulse generator outputting said pulse signal by detecting the members on said encoder.

15. The camera of claim 14, wherein said encoder is a circular wheel, said plurality of members are alternating transparent and opaque portions of said circular wheel, and said pulse generator is a photo-interrupter.

16. The camera of claim 15, wherein said transparent portions have a width less than a width of said opaque portions, a transition from one of said opaque portions to one of said transparent portions generating one of the front and rear edges, and a transition from one of the transparent portions to one of the opaque portions generating the other one of the front and rear edges.

17. A camera comprising:

signal output means for producing a pulse signal from scrolling of film through the camera, said pulse signal being comprised of a continuous series of alternating long and short pulses, each pulse having a front edge and a rear edge;

means for determining a time interval, a, of said short pulses;

means for determining a dot formation time interval, t, according to the formula t=a/n, wherein n is a positive number greater than 1;

data display means for displaying a series of characters in a dot matrix form on the film as the film is scrolled through the camera; and display drive control means for driving said data display means to form dots on the film at said time interval t between said front and rear edges of the pulse signal.

18. The camera of claim 17, wherein display drive control means also drives said data display means to form the series of characters on the film so that every character in said series of characters is always started at the front edge of said pulse signal or every character in said series of characters is always started at the rear edge of said pulse signal.

19. The camera of claim 18, wherein said display drive control means links the timing of the start of the display of every character formed on the film by said data display means to the front edge of the pulse signal for all characters so that every character in said series of characters is started at the front edge of said pulse signal.

20. The camera of claim 17, wherein n=2.

21. A method of controlling a camera to uniformly record characters on film using a data display device in the camera that displays a series of characters in a dot matrix form on the film as the film is scrolled through the camera, said method comprising the steps of:

producing a pulse signal from scrolling of film through the camera, said pulse signal being comprised of a continuous series of pulses, each pulse having a front edge and a rear edge, a first time period extending between a front edge and a subsequent rear edge, and a second time period extending between a rear edge and a subsequent front edge, said second time period being different from said first time period such that said continuous series of pulses is a continuous series of alternating long pulses and short pulses; and driving said data display device to form the series of characters on the film by forming dots linked to a series of consecutive front and rear edges of said pulse signal in accordance with character data, said driving step including controlling a timing of a start of the display of every character by said data display device so that every character in said series of characters is always started at the front edge of said pulse signal or every character in said series of characters is always started at the rear edge of said pulse signal.

22. The method of claim 21, wherein the timing of the start of the display of every character by said data display device is linked to the front edge of the pulse signal for all characters recorded on the film so that every character in said series of characters is started at the front edge of said pulse signal.

23. The method of claim 21, further comprising the steps of:

counting a time interval, a, between adjacent front and rear edges of said pulse signal; and determining a dot formation time interval, according to the formula t=a/n, wherein n is a positive number greater than 1; and wherein said data display device also is driven to form dots on the film at said time interval, t, between said front and rear edges of the pulse signal.

24. The method of claim 23, wherein n=2.

25. The method of claim 23, wherein the time interval assigned to a is a shorter one of said first and second time periods.

* * * * *